United States Patent
Rejman et al.

(10) Patent No.: US 9,046,041 B2
(45) Date of Patent: Jun. 2, 2015

(54) GEARBOX POSITIONING DEVICE

(71) Applicant: Pratt & Whitney Canada Corp., Longueuil (CA)

(72) Inventors: Marcin Rejman, Rzeszow (PL); Louis Brillon, Varennes (CA); David Gagnon-Martin, Longueuil (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 235 days.

(21) Appl. No.: 13/626,160

(22) Filed: Sep. 25, 2012

(65) Prior Publication Data

US 2014/0084130 A1 Mar. 27, 2014

(51) Int. Cl.
| | |
|---|---|
| F16M 7/00 | (2006.01) |
| F02C 7/20 | (2006.01) |
| B64D 27/00 | (2006.01) |
| F02C 7/32 | (2006.01) |
| B64D 27/26 | (2006.01) |

(52) U.S. Cl.
CPC ... *F02C 7/32* (2013.01); *F02C 7/20* (2013.01); *B64D 2027/266* (2013.01); *F05D 2260/30* (2013.01)

(58) Field of Classification Search
CPC .............. B64D 27/26; F02C 7/20; F02C 7/32
USPC ............. 248/660, 639, 646, 658; 60/796, 797
See application file for complete search history.

(56) References Cited

U.S. PATENT DOCUMENTS

| | | | | | |
|---|---|---|---|---|---|
| 1,632,991 | A | * | 6/1927 | Booth | 411/429 |
| 4,117,997 | A | * | 10/1978 | Gitzendanner | 248/646 |
| 4,717,094 | A | * | 1/1988 | Chee | 244/54 |
| 6,170,252 | B1 | | 1/2001 | Van Duyn | |
| 6,212,974 | B1 | | 4/2001 | Van Duyn | |
| 6,347,765 | B1 | * | 2/2002 | Jule et al. | 244/54 |
| 6,675,584 | B1 | * | 1/2004 | Hollis et al. | 60/796 |
| 6,676,874 | B1 | * | 1/2004 | Muller | 264/249 |
| 6,843,629 | B2 | * | 1/2005 | Farral et al. | 411/178 |
| 6,895,761 | B2 | * | 5/2005 | Mitchell et al. | 60/796 |
| 7,438,262 | B2 | * | 10/2008 | Chamberlain | 244/54 |
| 8,020,831 | B2 | * | 9/2011 | Dron et al. | 248/554 |
| 8,186,618 | B2 | * | 5/2012 | Beaufort | 244/54 |
| 2003/0014964 | A1 | * | 1/2003 | Sathianathan et al. | 60/226.1 |
| 2010/0011780 | A1 | * | 1/2010 | Varney et al. | 60/796 |

FOREIGN PATENT DOCUMENTS

GB 866018 A * 4/1961

* cited by examiner

*Primary Examiner* — Joshua J Michener
*Assistant Examiner* — Chiedu Chibogu
(74) *Attorney, Agent, or Firm* — Norton Rose Fulbright Canada LLP

(57) ABSTRACT

A gearbox positioning device to position a gearbox relative to an engine case of a gas turbine engine. The positioning device has a first and second part, with the first part having a connecting cavity of predetermined shape and being secured to the engine case. The second part has a coupling post received in the connecting cavity and constraining displacement of the gearbox in a laterally transverse direction with respect to the central longitudinal axis of the engine. The device permits movement of the gearbox in the axial direction of the engine as well as angular movement to prevent stressing the engine case during thermal growth of the engine case or support linkage imbalance. A gearbox positioning system incorporating the positioning device and the method of attaching same to the engine casing is also included.

17 Claims, 5 Drawing Sheets

GEARBOX POSITIONING DEVICE

TECHNICAL FIELD

The application relates generally to gas turbine engines and, more particularly, to a gearbox positioning device which couples the gearbox to the engine case of the gas turbine engine. It also relates to a gearbox positioning system incorporating the positioning device and the method of attaching same to the engine casing.

BACKGROUND OF THE ART

Modern gas turbine aircraft engines have a gearbox that is mounted on their external cases. The gearbox is generally positioned under the engine case and uses power from the engine to drive the major accessories needed for engine functions, such as generators for electricity, pumps for circulating fluids and heat exchangers for cooling oil or heating fuel. The accessories are frequently mounted on the gearbox.

Various mounting arrangements are used to mount the gearbox to the external case of the engine. The gearbox is often connected to the engine case at two or more locations along the length of the gearbox. For example, a forward V-shaped link may be used to fasten the front of the gearbox to the engine. A plurality of side hanger links may be used on either side of the gearbox housing to stabilize the gearbox. Further, a locator or positioning device may also be used to provide alignment of the gearbox with respect to the engine case and prevent undesirable movement of the gearbox relative to the engine.

It is known to decouple the gearbox from the engine to protect both from extreme loads by allowing some floating of the gearbox. It is also known to provide fuse systems with dampers or a locator with shearing diaphragms to decouple the gearbox from the engine case to protect form extreme loads.

There is, however, a need to provide a gearbox positioning device which is capable of relieving thermal growth from the engine case and/or support linkage imbalance.

SUMMARY

In one aspect, there is provided a gearbox positioning device for positioning a gearbox, which is attached to a support linkage, on an engine case of a gas turbine engine having a central longitudinal axis, the positioning device comprising: a first part secured to the engine case, the first part having a connecting cavity at least partly circumscribed by an inner side wall; and a second part secured to the gearbox, the second part having a coupling post projecting therefrom for mating reception within the connecting cavity; the connecting cavity being shaped relative to the coupling post such that, when the coupling post mates with the connecting cavity, the inner side wall of the connecting cavity constrains movement of the coupling post in a direction laterally transverse to the longitudinal axis of the gas turbine engine while permitting linear movement of the coupling post in the connecting cavity along said longitudinal axis as well as angular movement about a central longitudinal axis of the coupling post.

In a further aspect, there is provided a gearbox positioning system for attaching a gearbox to an engine case of a gas turbine engine. The system has a support linkage connected to the gearbox for supporting same relative to the engine case. The linkage includes a positioning device having a first part adapted to be secured to the engine case, said first part having a connecting cavity of predetermined cross-sectional shape, said connecting cavity having an axial direction extending substantially along a central longitudinal axis of said gas turbine engine and a laterally transverse direction extending substantially laterally to said central longitudinal axis, the positioning device further comprising a second part adapted to be secured to the gearbox, said second part having a coupling post of predetermined transverse cross-sectional shape projecting therefrom for mating reception within said connecting cavity with said coupling post in frictional engagement with opposed lateral regions of an inner surrounding side wall of said connecting cavity, and a clearance gap defined along said axial direction between said coupling post and the inner surrounding side wall of said connecting cavity, the connecting cavity being shaped relative to the coupling post such that, when the coupling post mates with the connecting cavity, the inner surrounding side wall of the connecting cavity constrains movement of the coupling post in said laterally transverse direction while permitting relative movement along said axial direction as well as relative angular movement about a central longitudinal axis of the coupling post.

According to a still further aspect, there is provided a method of attaching a gearbox to an engine case of a gas turbine engine using an isostatic support linkage arrangement having a central mount comprised by a positioning device as above-described. The method comprises securing the support linkage under the engine case with the first part of the positioning device secured to the engine case and aligned on the central longitudinal axis of the gas turbine engine and the second part of the positioning device secured at a central balanced load position on a top wall of the gearbox with the coupling post projecting in the connecting cavity.

DESCRIPTION OF THE DRAWINGS

Reference is now made to the accompanying figures in which.

DETAILED DESCRIPTION

Figure 1:
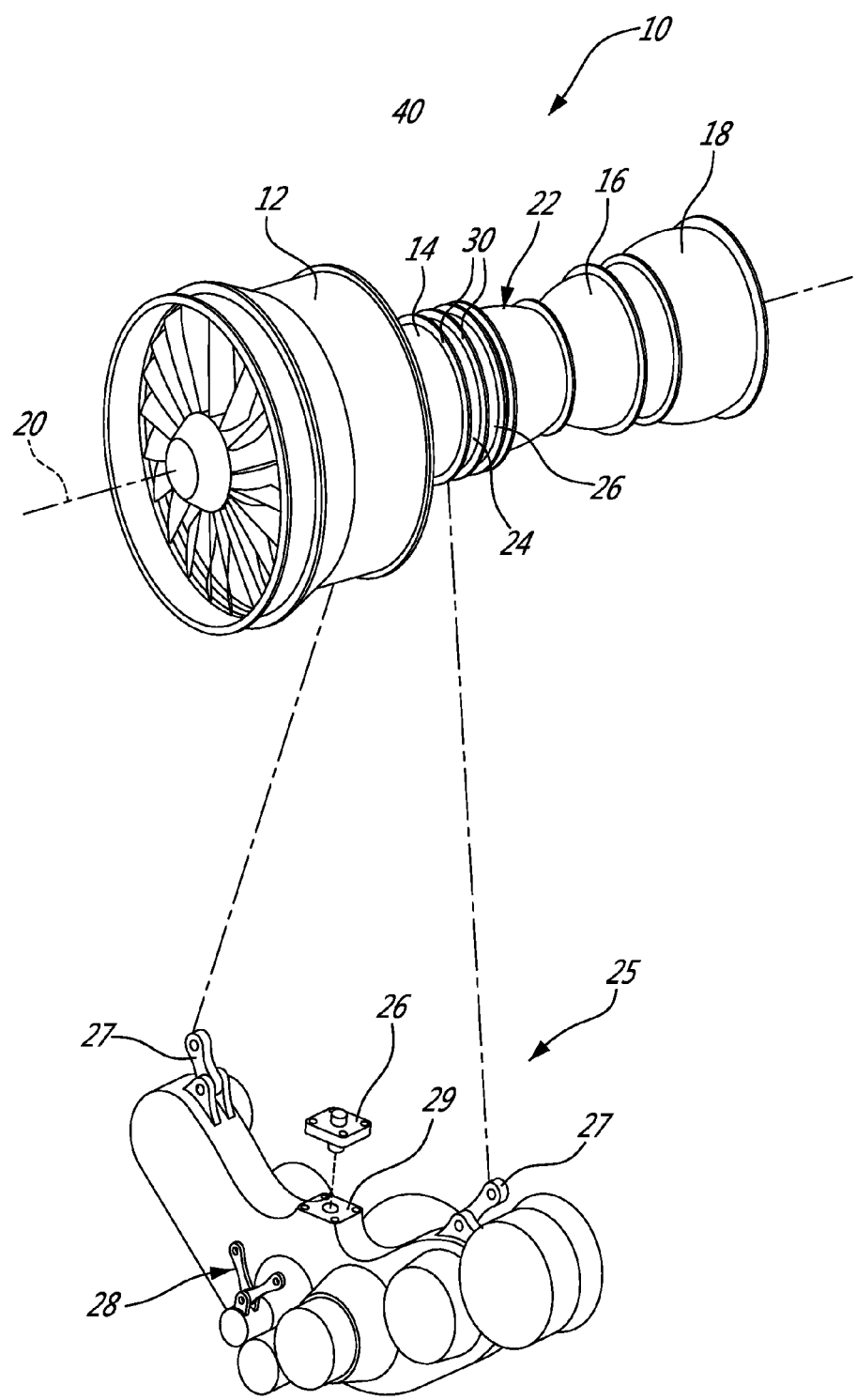
FIG. 1 is an isometric view of a typical axial flow turbo fan engine showing a typical gearbox to be mounted to the engine's external case.

Referring now to FIG. 1, there is shown a gas turbine engine 10 which includes as its principle components a fan section 12, a compression section 14, a combustion section 16 and a turbine section 18. The compression and turbine sections each contain one or more stages of a compressor and turbine (not shown) which rotate about a central rotational axis 20. The principle components are circumscribed by an essentially cylindrical external case 22 which serves as a main structure support for the engine. The external case is usually constructed of individual case sections, such as case sections 24 and 26, which are joined together at bolted flanges, such as flange 30. A gearbox 25 is mounted to the external case section 22 by a support arrangement which includes side hanger links 27, the V-shaped link 28 and a locator 26.

Figure 2:
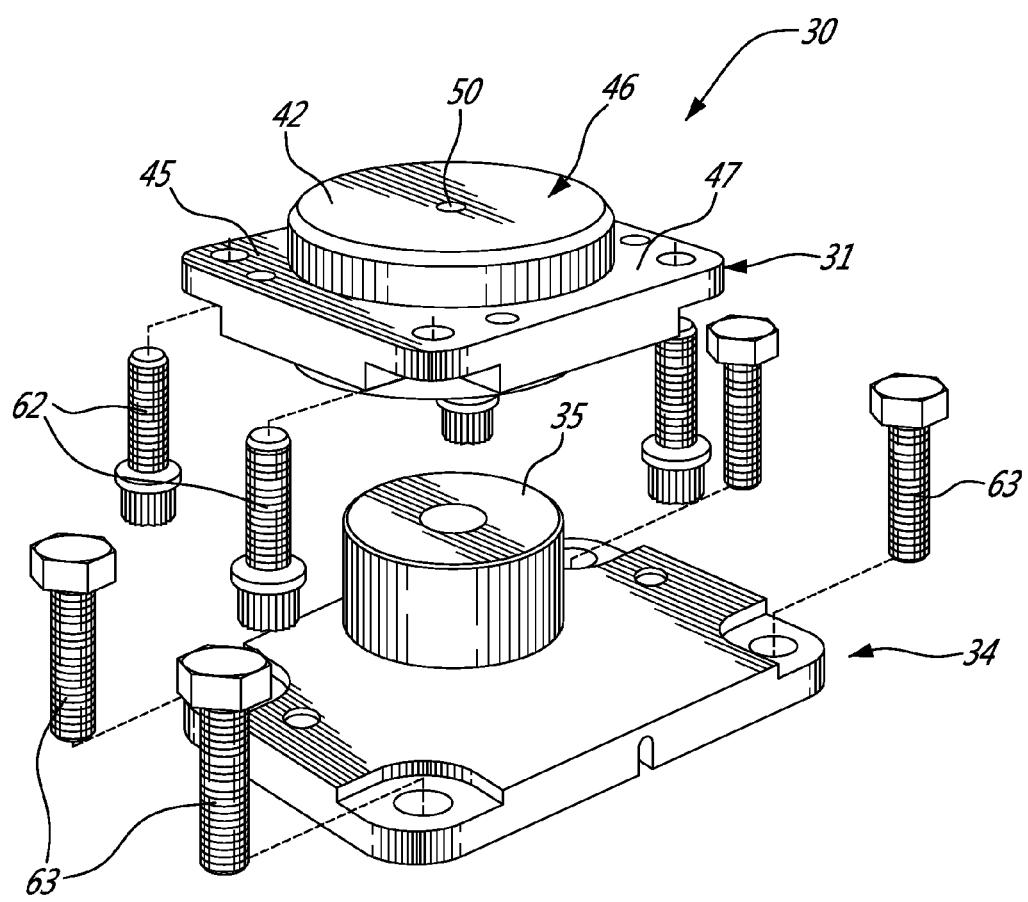
FIG. 2 is an isometric exploded view showing one possible construction of the gearbox positioning device in accordance with the present application.
Figure 3:
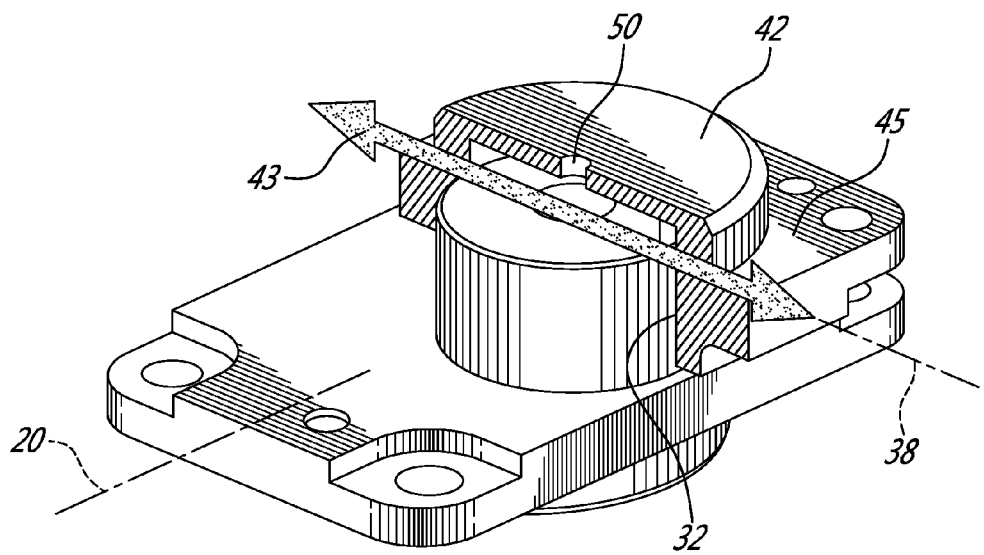
FIG. 3 is an isometric view of the gearbox positioning device, partly sectioned, and illustrating the lateral constrainment of the gearbox in relation to the longitudinal axis of the engine case.
Figure 4:
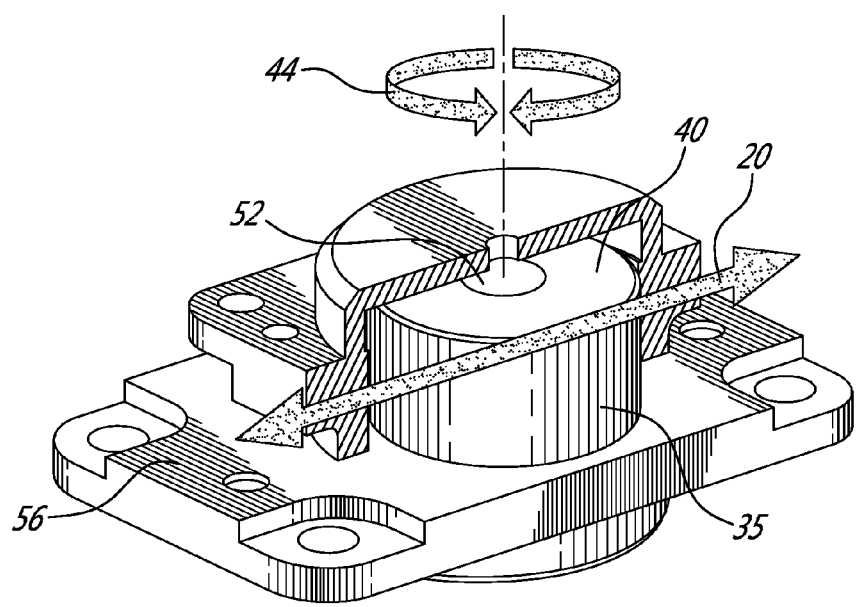
FIG. 4 is an isometric view of the gearbox positioning device, partly sectioned, illustrating the non-constrainment of the gearbox with respect to the engine case in the axial and rotational directions.

With reference now to FIG. 2, there is illustrated an embodiment of a gearbox positioning device 30, which may replace the locator 26 of FIG. 1 secured to the top wall 29 of the gearbox 25. The gearbox positioning device 30 positions the gearbox 25 in a horizontal plane relative to the turbine engine 10 and is associated with an isostatic support linkage arrangement of a type suitable for its application. The positioning device 30 comprises a first part 31 which is adapted to be secured to the engine case 22. This first part 31, as better illustrated in FIGS. 3 to 7, has a connecting cavity 32 of predetermined contour shape. The cavity 32 has an open bottom end 33 (see FIG. 6).

As also shown in FIG. 2, the gearbox positioning device 30 also has a second part 34 which is adapted to be secured to the gearbox 25. The second part has a coupling post 35 which is of predetermined transverse cross-sectional shape, as will be described later, and projects in a direction for reception in the connecting cavity 33 with the coupling post in frictional engagement with opposed lateral regions 36 (FIG. 7) of the inner side wall 37 (FIG. 6) of the connecting cavity 32. Accordingly, the second part 34, which is connected to the gearbox 25, is in frictional engagement with the first part 31, which is connected to the engine case along a lateral axis 38 (FIG. 3) which is transverse to the central, longitudinal or rotational axis 20 of the engine.

Figure 5:
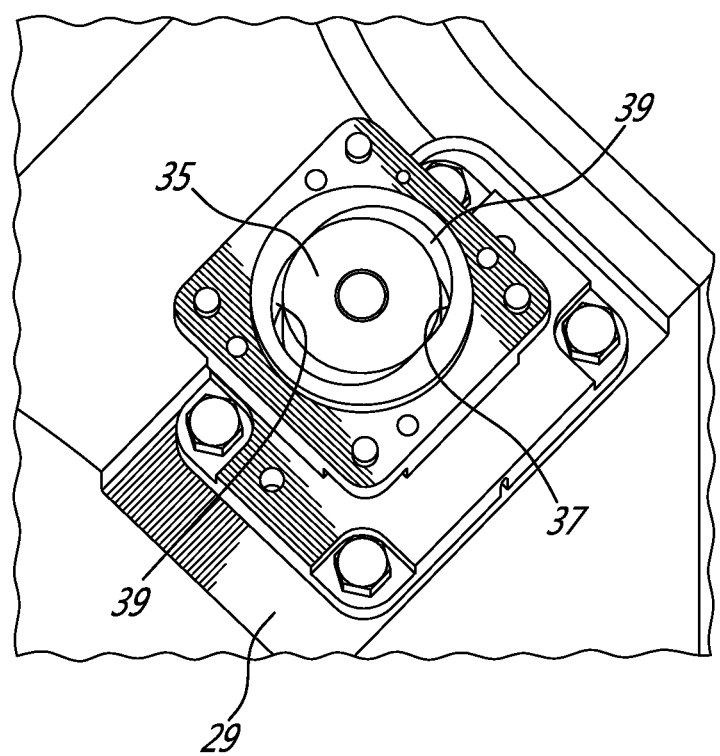
FIG. 5 is a top isometric view illustrating the construction of an embodiment of the gearbox positioning device and particularly the shape of the connecting cavity with the coupling post engaged therein.

With reference to FIG. 5, it can be seen that the coupling post 35 has a circular transverse cross-section and the connecting cavity 32 has an oblong shape wherein a clearance gap 39 is defined in opposed axial regions between the coupling post and opposed axial regions of the inner side wall 37 of the connecting cavity 32.

Figure 6:
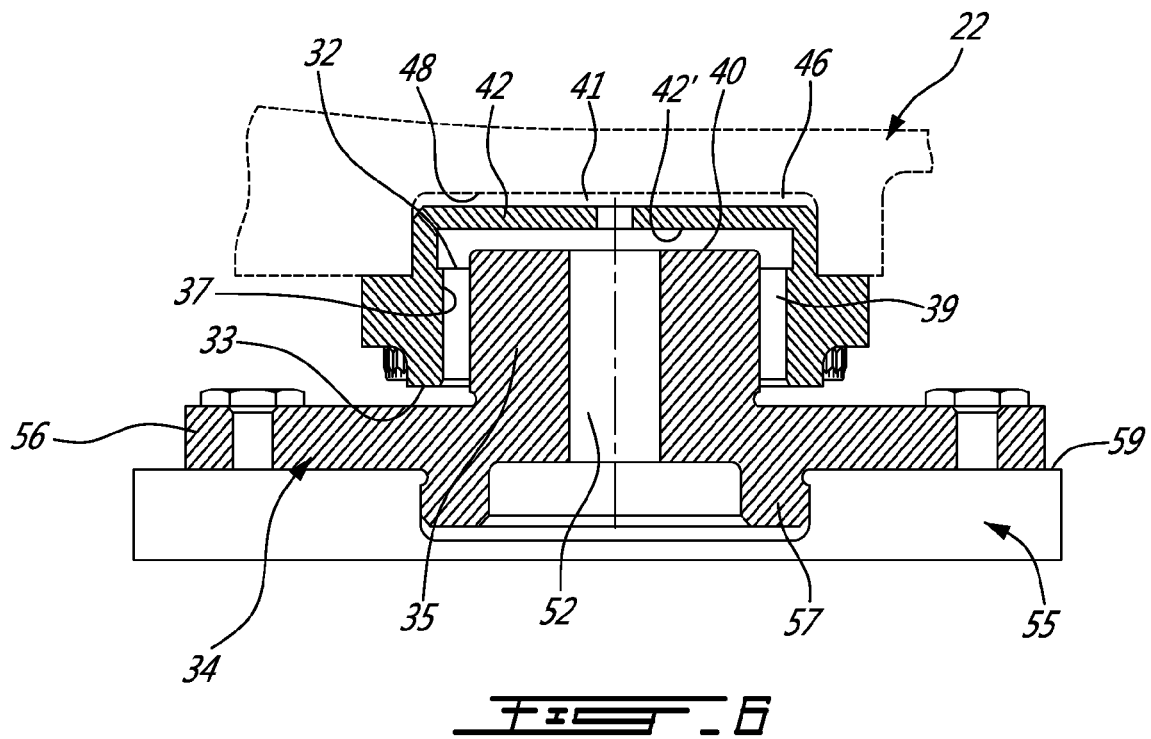
FIG. 6 is a cross-sectional view of the gearbox positioning device interconnecting the gearbox to the engine case and illustrating the axial clearance wherein the coupling post is spaced from the opposed side walls of the connecting cavity secured to the turbine engine case.
Figure 7:
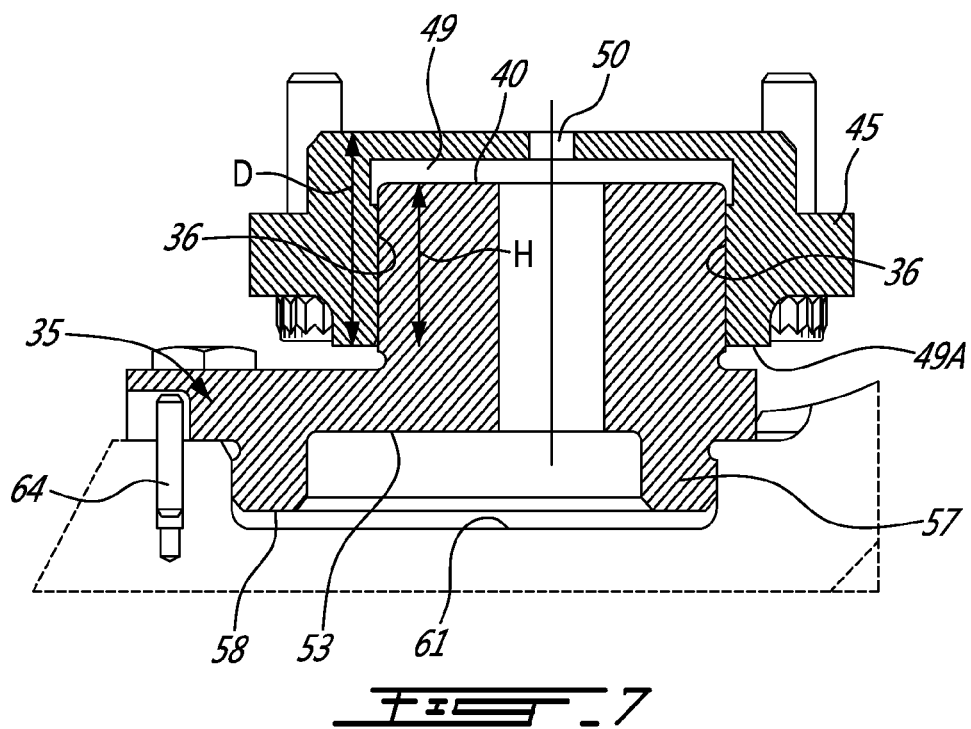
FIG. 7 is a cross-sectional view of the gearbox positioning device as seen in the lateral direction wherein the connecting post is in frictional contact with opposed inner side wall portions of the connecting cavity.

The coupling post 35 has a flat, top wall 40 and has a height H which is less than the depth D of the connecting cavity 32 whereby a space 41, as better seen from FIGS. 6 and 7, is formed between the top wall 40 of the coupling post 35 and the inner face 42' of the top wall 42 of the connecting cavity 32. The coupling post 35, when frictionally engaged in the connecting cavity 32, as shown in FIG. 7, constrains the gearbox in a lateral direction, as illustrated by arrow 43 in FIG. 3, and provides un-constrainment of the gearbox in the axial direction, namely along the central rotational axis 20 of the engine and also in a rotational direction as indicated by arrow 44 in FIG. 4, thereby permitting axial and rotational motion of the gearbox with respect to the engine case to thereby compensate for thermal growth of the engine case during normal engine operation. It also compensates for support linkage imbalance and thereby not stressing the engine case under such condition. Such compensation or relief is accommodated by the axial and/or rotational motion between the coupling post 35 and the connecting cavity 32.

As shown in the embodiment illustrated herein, the connecting cavity 32 may be of oblong shape and the coupling post 35 may be of circular transverse cross-section. However, other shapes of the coupling post and connecting cavity is conceivable to provide the same relief, such as both the coupling post and the connecting cavity 32 could be made of oval or oblong shape and provide the same interconnection of the parts 31 and 34 together and permitting the gearbox to be unconstrained in the axial and rotational directions. Rectangular configurations with arcuate sections are also conceivable.

With reference again to FIGS. 1 to 3, it can be seen that the first part 31 is secured to the engine case 22 by a connecting flange 45. A hollow disc 46 projects from a top surface 47 of the connecting flange 45 and has a predetermined shape, herein circular, to be received in tight fit within a securement cavity 48 (see FIG. 6) formed in the engine case 22. The vent hole 50 allows for the escape of air from within the cavity 48 during the tight fit installation. The connecting cavity 32 is formed in the hollow disc 46 from a bottom surface 49A of the connecting flange 45. The first and second parts 31 and 34 are preferably casted parts or may be formed in sections.

As can be more clearly seen from FIGS. 6 and 7, the disc 46 has a height which is less than the depth of the securement cavity 48 forming a space 49 between the top surface of the hollow disc 47 and the inner surface of the securement cavity 48. As also shown in FIGS. 6 and 7, a vent conduit 52 is also formed in the coupling post 35 and extends from the flat top wall 40 thereto to a bottom face 53 thereof. The vent conduit 52 allows the escape of air form its securement cavity 58 in the gearbox top wall during tight fit installation.

The second part 34 is secured to the gearbox top wall by a connecting flange 56 and the coupling post is integrally formed with the connecting flange. Similarly, the hollow disc 46 is integrally formed with the connecting flange 45 of the first part. A connecting ring 57 is also formed integral with the connecting flange 56 and protrudes from a bottom face of the connecting flange and is configured for tight fit connection in a securement cavity 58 formed in the top face 59 of the gearbox top wall 55. The bolt connecting flanges 45 and 56 are secured by bolts 62 and 63, respectively, as shown in FIG. 2. As also shown in FIG. 7, a positioning pin 64 is provided to ensure perfect alignment of the second part 34 in the top wall 29 of the gearbox 25.

The gearbox positioning device couples the gearbox to the engine case of the gas turbine engine and relieves thermal growth from the engine case without imposing additional load on the engine case. Support linkage imbalance may also be accommodated without stressing the engine case.

This application also contemplates a gearbox positioning system for attaching the gearbox 25 to the engine case 22 of the gas turbine engine 10 using an isostatic support linkage arrangement having a central mount comprised of the positioning device 30 as described herein.

Still further, the application contemplates a method of attaching a gearbox, such as the gearbox 25, to an engine case of a gas turbine engine, an example of which is shown in FIG. 1. The method comprises securing the support linkage under the engine case with the first part 31 of the positioning device secured under the engine case substantially along the central longitudinal axis 20 of the turbine engine. The method further comprises securing the second part 34 of the positioning device 30 at a central balance load position, such as the location 29 indicated in FIG. 1 of the gearbox 25 therein illustrated and on a top wall of the gearbox with the coupling post of the second part projecting in the connecting cavity and in frictional engagement with the opposed lateral regions of the inner surrounding side wall of the connecting cavity.

Although the gearbox positioning device has been shown and described with respect to a detailed embodiment thereof, it should be understood by those skilled in the art that various changes in form and detail thereof may be made without departing from the spirit and scope of the claimed invention.

The invention claimed is:

1. A gearbox positioning device for positioning a gearbox, which is attached to a support linkage, on an engine case of a gas turbine engine having a central longitudinal axis, the positioning device comprising: a first part secured to the engine case, the first part having a connecting cavity circumscribed by an inner side wall and a top wall substantially closing an end the cavity; and a second part secured to the gearbox, the second part having a coupling post projecting therefrom for mating reception within the connecting cavity; the connecting cavity being shaped relative to the coupling post such that, when the coupling post mates with the connecting cavity, the inner side wall of the connecting cavity constrains movement of the coupling post in a direction laterally transverse to the longitudinal axis of the gas turbine engine while permitting linear movement of the coupling post in the connecting cavity along said longitudinal axis as well as angular movement about a central longitudinal axis of the coupling post, the coupling post being shorter than a depth of the connecting cavity such that a space is formed between a top wall of the coupling post and the top wall of the connecting cavity, and a vent hole being formed in the top wall of the connecting cavity to evacuate air during assembly of the first part with the second part.

2. A gearbox positioning device as claimed in claim 1 wherein the inner side wall of the connecting cavity is an oblong shape side wall with said connecting cavity being longer along the central longitudinal axis of the gas turbine engine, and wherein the coupling post has a circular cross-sectional shape.

3. A gearbox positioning device as claimed in claim 2 wherein said first part is secured to said engine case by a connecting flange, and a hollow disc projecting from a top surface of said connecting flange and having a predetermined shape to be received in tight fit within a securement cavity formed in the engine case of the gas turbine engine, said connecting cavity being formed in said hollow disc with an open end thereof formed in a bottom surface of the connecting flange.

4. A gearbox positioning device as claimed in claim 3 wherein said hollow disc has the top wall of the connecting cavity, the top wall being flat, and the vent hole formed in said top wall to evacuate air from said securement cavity during installation of said first part.

5. A gearbox positioning device as claimed in claim 4 wherein a vent conduit is formed in said coupling post and extends through said coupling post.

6. A gearbox positioning device as claimed in claim 2 wherein said second part is secured to the gearbox by a connecting flange, said coupling post being integrally formed with said connecting flange, and a connecting ring protruding from a bottom face of said connecting flange and configured for tight fit connection in a securement cavity formed in a top face of a top wall of said gearbox.

7. A gearbox positioning device as claimed in claim 6 wherein a vent conduit is formed in said coupling post and extends from the top wall thereof and through said connecting flange and connecting ring to evacuate air from said securement cavity during installation of said second part.

8. A gearbox positioning device as claimed in claim 6 wherein said connecting ring has a height which is less than the depth of said securement cavity.

9. A gearbox positioning device as claimed in claim 1 wherein the second part is secured to a top wall of the gearbox at a central balanced load position.

10. A gearbox positioning system for attaching a gearbox to an engine case of a gas turbine engine; the system comprising: a support linkage connected to the gearbox for supporting the gearbox relative to the engine case, the support linkage having a positioning device for positioning the gearbox relative to the engine case, the positioning device having a first part adapted to be secured to the engine case, said first part having a connecting cavity of predetermined cross-sectional shape, said connecting cavity defining an axial direction and a laterally transverse direction, the axial direction extending substantially along a central longitudinal axis of said gas turbine engine, the laterally transverse direction extending substantially perpendicular to said central longitudinal axis, the positioning device further comprising a second part adapted to be secured to the gearbox, said second part having a coupling post of predetermined transverse cross-sectional shape projecting therefrom for mating reception within said connecting cavity with said coupling post in frictional engagement with opposed lateral regions of an inner surrounding side wall of said connecting cavity, and a clearance gap defined along said axial direction between said coupling post and the inner surrounding side wall of said connecting cavity, the connecting cavity being shaped relative to the coupling post such that, when the coupling post mates with the connecting cavity, the inner surrounding side wall of the connecting cavity constrains movement of the coupling post in said laterally transverse direction while permitting relative movement along said axial direction as well as relative angular movement about a central longitudinal axis of the coupling post, the connecting cavity being circumscribed by the inner surrounding side wall and a top wall substantially closing an end the cavity, the coupling post being shorter than a depth of said connecting cavity such that a space is formed between a top wall of the coupling post and the top wall of the connecting cavity, and a vent hole being formed in the top wall of the connecting cavity to evacuate air during assembly of the first part with the second part.

11. A gearbox positioning system as claimed in claim 10 wherein said connecting cavity has an oblong shape with said connecting cavity being longer in said axial direction, said transverse cross-sectional shape of said coupling post being of circular shape.

12. A gearbox positioning system as claimed in claim 11 wherein said first part is secured to the engine case by a connecting flange, and a hollow disc projecting from a top surface of said connecting flange and having a predetermined shape to be received in tight fit within a securement cavity formed in the engine case, said connecting cavity being formed in said hollow disc.

13. A gearbox positioning system as claimed in claim 12 wherein said hollow disc has the top wall of the connecting cavity, the top wall being substantially flat, and the vent hole is formed in said top wall to evacuate air from said securement cavity during installation of said first part.

14. A gearbox positioning system as claimed in claim 10 wherein a vent conduit is formed in said coupling post and extends through said coupling post.

15. A gearbox positioning system as claimed in claim 10 wherein said second part is secured to the gearbox by a connecting flange, said coupling post being integrally formed with said connecting flange, and a connecting ring protruding from a bottom face of said connecting flange and configured for tight fit connection in a securement cavity formed in a top face of a top wall of the gearbox.

16. A gearbox positioning system as claimed in claim 15 wherein a vent conduit is formed in said coupling post and extends from the top wall thereof and through said connecting flange and connecting ring to evacuate air from the securement cavity during installation of said second part.

17. A gearbox positioning system as claimed in claim 10 wherein said support linkage arrangement is an isostatic support arrangement.

\* \* \* \* \*